UNITED STATES PATENT OFFICE.

KURT KOTTMANN, OF BERNE, SWITZERLAND, ASSIGNOR TO SOCIETY OF CHEMICAL INDUSTRY IN BASLE, OF BASEL, SWITZERLAND.

COMBINATION OF METALS WITH ALBUMENS.

1,371,381. Specification of Letters Patent. Patented Mar. 15, 1921.

No Drawing. Application filed May 26, 1917. Serial No. 171,210.

*To all whom it may concern:*

Be it known that I, KURT KOTTMANN, a citizen of the Swiss Republic, and resident of Berne, Switzerland, have invented new and useful Combinations of Metals with Albumens, of which the following is a full, clear, and exact specification.

In my prior application for Letters Patent No. 122355, filed September 27, 1916, I have described a process for the manufacture of combinations of metals with albumens, consisting in acting with metals or metal compounds on albumens obtained from the pathologically or physiologically modified or infected human or animal organs or tissues or on the products of decomposition of the said albumens. These metal albumen combinations have proved to be valuable products for the diagnosis and the therapeutical treatment of physiological and pathological modification of the animal or human organism resulting from the presence of ferments decomposing albumen.

I have now further found, that new metal albumen combinations can also be obtained by treating with a metal or a metal compound such albumen compounds of normal human or animal organs or tissues or expressed juices thereof which are, by known methods, freed from constituents, soluble in water, such as decomposition products, to such an extent that they show no longer the ninhydrin reaction. These new combinations differ from the known metal albumen combinations, as obtained from the not ninhydrin free albumens of normal organs or tissues, by being highly suitable for therapeutic purposes. Whereas the metal albumen combinations obtained from normal and not further treated organ albumen compounds show, in the treatment of men and animals, severe and troublesome secondary symptoms, in addition to the desired specific action, this does not occur with the metal combinations of albumen compounds previously treated till ninhydrin free. On the contrary they show, with exclusion of any other secondary symptom only the desired curing action. Albumen compounds from normal animal or human organs, previously treated till ninhydrin free, have not been used up to now for the preparation of metal combinations.

The new metal albumen combinations are prepared by treating with a metal or metal compound the albumen compounds from normal human or animal organs, freed by known methods from constituents soluble in water, such as decomposition products, for instance by continued boiling with water to such an extent that they show no longer the ninhydrin (Triketo-hydrinden hydrate) reaction. The excess of metal used must also be removed in a suitable way. The metal albumen combinations thus obtained which contain the metal in a masked respectively non-ionized condition are specifically broken up, when in contact with albumen decomposing ferments, whereby the metal is liberated and can be detected by the usual reagents, which property renders them also useful for diagnostic purposes. The new metal albumen combinations are in the form of slightly colored powders, insoluble in water and the usual organic solvents.

The invention is illustrated by the following examples:

*Example 1.*—An animal or human lung is freed from blood, comminuted, freed from fat and boiled with distilled water, until ½ liter of the washings, concentrated to 1 ccm. show no longer a reaction, when treated with 1 ccm. of a 1% ninhydrin solution. The boiled out lung-albumen combination is sifted through a fine sieve, suspended in a little water and mixed, by vigorous stirring, with an excess of a 30% solution of iron chlorid; it is then allowed to stand for a few hours and the iron-lung-albumen combination formed is then washed with water, till the washings are entirely free of iron. The combination is placed in acetone for a quarter of an hour; the acetone is removed and the combination is dried for 3 hours under high vacuum on a water-bath at 70° C.; finally it is triturated in a mortar, sifted through a fine meshed metal sieve and charged to the amount of 0.1 gr. into tubes of alkali-free Jena-glass, which are sealed by fusion and sterilized at 102° C. for 2 hours.

The pure iron-lung-albumen combination thus obtained is a fine brownish powder which contains the iron in non-ionized condition and is insoluble in water and the usual organic solvents.

*Example 2.*—An animal or human brain is freed from blood, comminuted, freed from fat and boiled with distilled water, until ½ liter of the washings, concentrated to 1 ccm. shows no longer a reaction, when treated with 1 ccm. of a 1% ninhydrin solution. The brain albumen thus prepared is sifted through a fine sieve and suspended in a little water; the suspension is mixed with an excess of a 20% solution of copper sulfate and allowed to stand for 4 hours. The combination of copper with brain-albumen is then washed with water, until the washings show no longer a copper reaction. It is suspended for some time in acetone, the acetone is drained off and the combination dried under high vacuum on a water bath at 70° C. On being triturated, the copper-brain-albumen combination forms a greenish-gray powder which contains the copper in masked i. e. non-ionized condition and is insoluble in water and the usual organic solvents.

*Example 3.*—An animal or human liver is freed from blood, comminuted, freed from fat and boiled with distilled water, according to the process of the foregoing examples, until cessation of the ninhydrin reaction.

The liver-albumen compound thus freed from decomposition products is sifted through a fine sieve, suspended in water and to the obtained suspension is added while stirring an excess of a 16% solution of silver nitrate. The mass is allowed to stand for several hours and the silver-liver-albumen compound formed is washed with water, until the washings show no longer a silver reaction. The substance dried and sterilized according to the manner indicated in Example 1 is a fine gray-white powder insoluble in water and the usual organic solvents.

*Example 4.*—The thyroid glands are comminuted, freed from blood and boiled with distilled water, until the water used for the purpose, after having been concentrated, shows no longer the ninhydrin reaction. The substance obtained is suspended in water, treated with an excess of a 2.5% solution of mercury chlorid and allowed to stand for a few hours; they are washed with water, until the excess of mercury salt has been removed, deprived from moisture by means of acetone, dried under vacuum, pulverized, sifted, and sterilized at 105° C. for 1 hour. The pure mercury combination from thyroid albumen is a fine yellowish-white powder, which contains the mercury in non-ionized form and is insoluble in water and the usual organic solvents.

Instead of the albumen compounds previously treated until they show no longer the ninhydrin reaction, specified in the examples, other albumen compounds of other animal or human organs or tissues, previously treated in an analogous manner, can be transformed into combinations with metals, showing generally analogous properties. For the metal salts indicated in the examples can be substituted other metal compounds, as for instance cadmium salts, chromium salts, gold salts, zinc salts, cobalt salts, etc., whereby the corresponding metal albumen combinations are obtained.

The application for diagnostic purposes of the new metal-albumen combinations consists in treating them with the ferment solution to be examined and detecting by means of the well known reactions the metal which has possibly been liberated; this is shown by the following example.

0.1 gr. of the iron-lung-albumen combination prepared as described in Example 1 is added to 2 ccm. of the serum obtained from the blood of the subject to be examined; the mixture is covered with 5 ccm. of toluene and placed for 16 to 24 hours in an incubator at a temperature of 39 to 42° C.; the toluene is removed and the serum poured on a filter, which is iron-free and which has been moistened with distilled water; the filtrate is completed to 4 ccm. and mixed with 2 ccm. of a 25% solution of hydrochloric acid (also iron free). After addition of 2 ccm. of a 5% solution of potassium ferrocyanid, and stirring, it is possible to detect, whether the serum is that of a phthisical or non-phthisical subject, seeing that in the former case a blue coloration appears through liberation of ionized iron.

What I claim is:

As new products the herein described combinations of metal with albumens obtained from normal animal cellules, capable of being used for diagnostic and therapeutic purposes, constituting slightly colored powders insoluble in water and the usual organic solvents, containing the metal in a non-ionized condition and from which the metal is liberated by their treatment with specifically decomposing ferments or fermentlike substances obtained from abnormal animal organs or tissues and can be detected by the usual methods.

In witness whereof I have hereunto signed my name this first day of May, 1917, in the presence of two subscribing witnesses.

KURT KOTTMANN.

Witnesses:
 ERNST K. BURANS,
 M. J. STEHLIN.